UNITED STATES PATENT OFFICE.

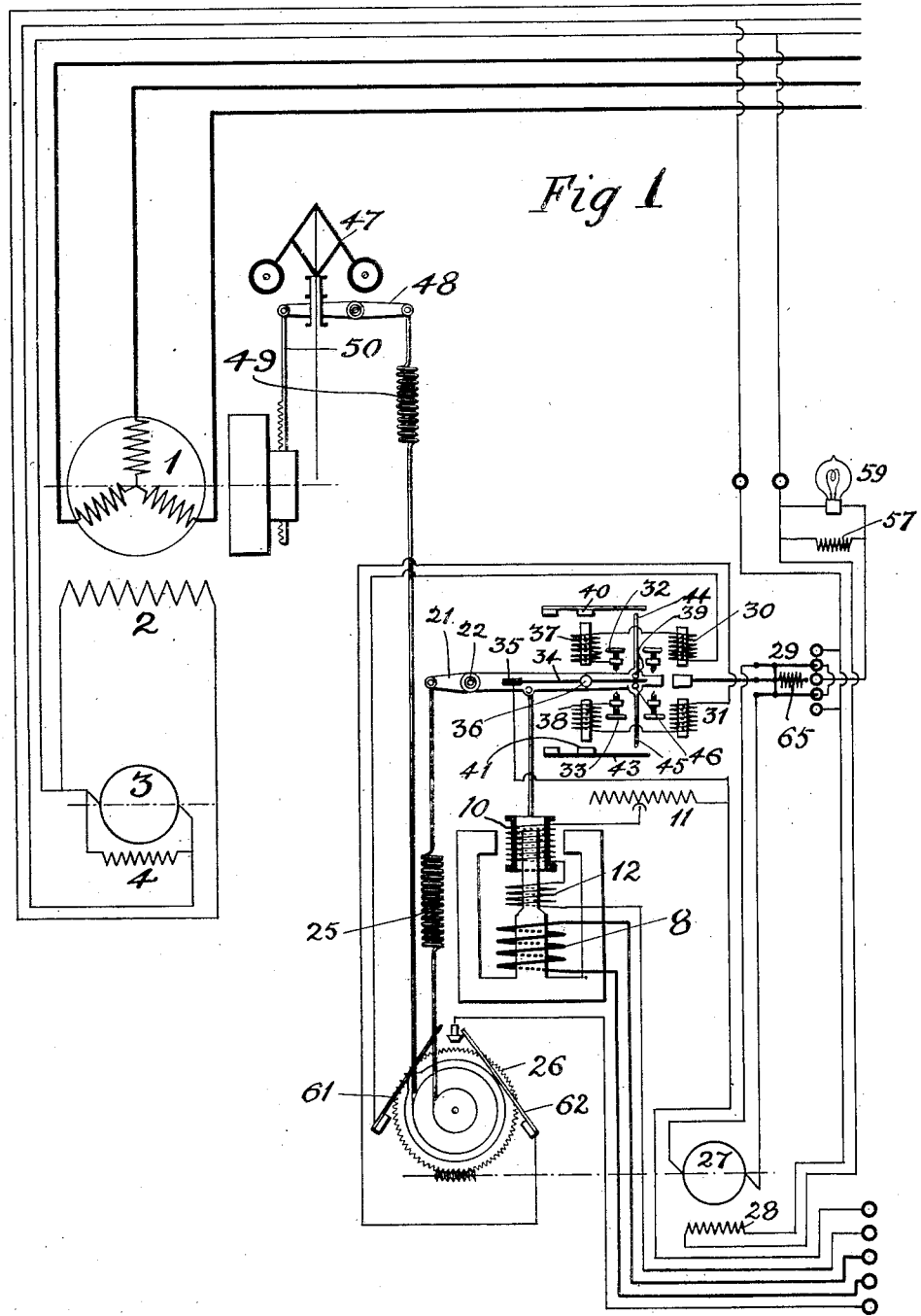

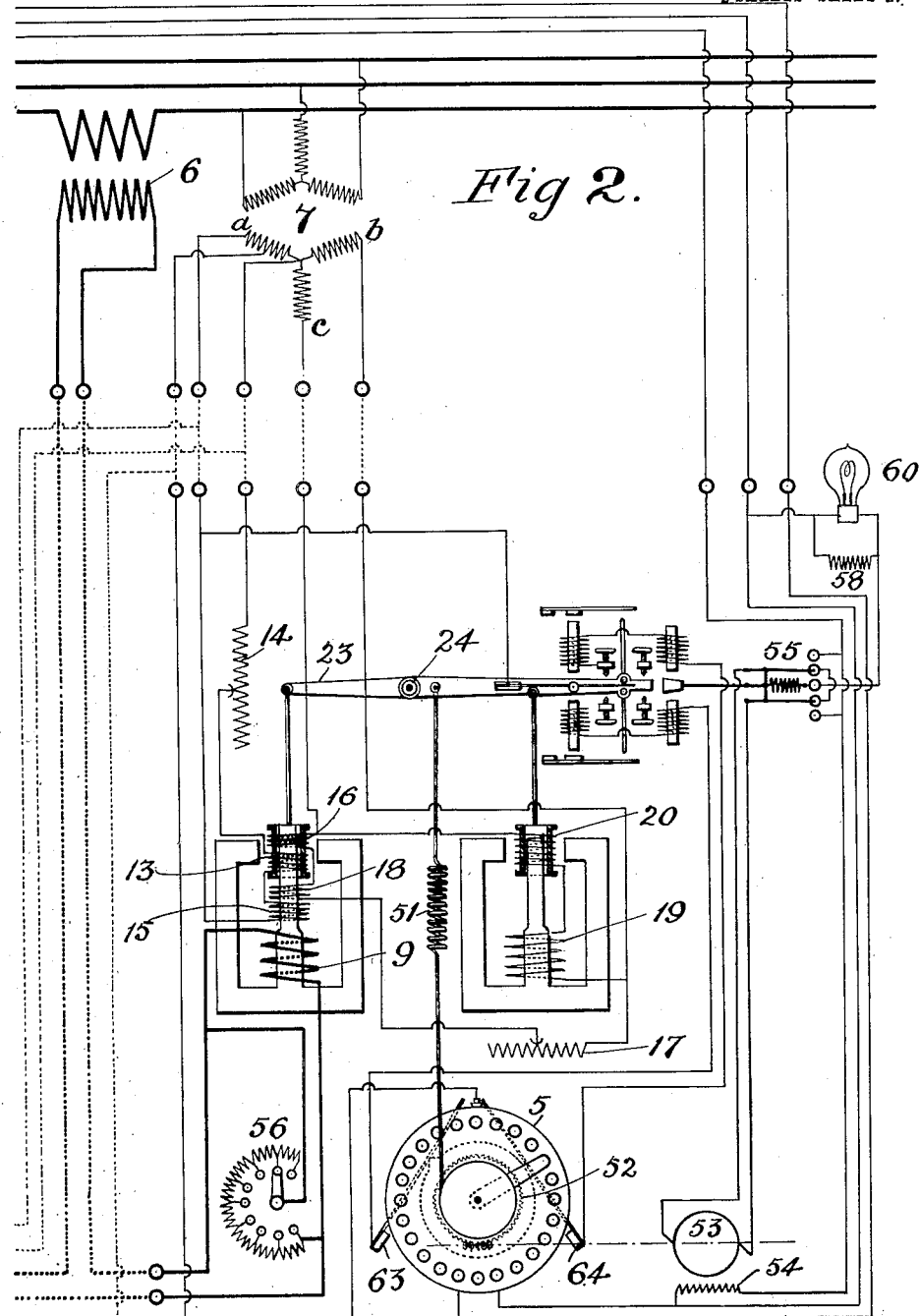

JOSEPH LOUIS ROUTIN, OF LYON, FRANCE.

MEANS FOR CONTROLLING ELECTRIC-CURRENT-DISTRIBUTING SYSTEMS.

No. 860,572.  Specification of Letters Patent.  Patented July 16, 1907.

Application filed December 15, 1905. Serial No. 291,911.

*To all whom it may concern:*

Be it known that I, JOSEPH LOUIS ROUTIN, a citizen of the French Republic, residing at Lyon, in France, have invented certain new and useful Improvements in Controlling Electric-Current-Distributing Systems, of which the following is a specification.

This invention relates to improvements in the means for controlling electric power distributing systems described in the specification of my previous application for patent filed 2 September 1904.

The improvements which form the subject-matter of the present invention relate in part to a special arrangement of the dynamometrical regulator and to a device which is used in conjunction with the voltmetrical regulator and is controlled by variations in the power-factor in such a manner that the tension is independent of the said variations.

The improvements also relate to a special arrangement for use in cases where a plurality of generators in parallel supply alternating currents, and to an arrangement for preventing periodical oscillations or hunting of the regulating mechanism.

The dynamometrical regulator or governor described in my previous specification aforesaid is efficient and reliable in its working, but is somewhat complicated more particularly if designed to govern an alternating machine. This governor can be considerably simplified by using relays in connection therewith. In this case the arrangement comprises a wattmeter acting by means of a relay or relays on a small electro-motor, and the latter acts with the aid of a spring on the antagonistic couple of the wattmeter; the connections are so made that when the current increases the motor is driven in the direction which produces an increase in the antagonistic force, and vice versa. The action is in principle analogous to the action of an ordinary wattmeter the readings of which are proportional to the torsion which balances an electro-magnetic couple. The motor also controls by means of a toothed wheel and worm, a spring which acts on the lever of the tachometrical governor described in my previous specification aforesaid. The tension of the said spring can thus be rendered proportional, at all times, to the input of the generator.

In my previous specification aforesaid it is explained that any diminution in the factor of power producing a fall of tension operates the voltmetrical governor by causing a variation in the attraction exerted by a solenoid connected up in parallel. If the variation of the factor of power takes place while the load remains constant, the dynamometrical governor does not come into action and the final tension is necessarily slightly lower than the initial tension. To raise the tension to its normal value it is necessary to provide a device which is caused to act by variations in the factor of power in the same way that the dynamometrical governor is caused to act by variations in the load. This device is similar to a wattmeter in its construction, but whereas one coil thereof is traversed by the main current the other coil is traversed by a current in quadrature with the tension.

In the improved apparatus which will now be described two dynamometrical governors are provided, one of which acts on the tachometrical governor, and the other on the voltmetrical governor, so as to allow of entirely dispensing with mechanical connection between the mechanical and the electrical regulating apparatus, and of rendering nevertheless, both the mechanical and the electrical regulation dependent on the variations in the power absorbed by the generator.

To allow of modifying at will the action of the dynamometrical governor with regard to the voltmetrical governor and of thus regulating the degree of overcompounding according to the load-current in the mains, a rheostat with variable resistance is joined as a shunt to the main current terminals of the wattmeter which acts on the voltmetrical governor.

The apparatus which compensates variations in the factor of power is combined with the apparatus which compensates variations in the load, so that the circuit traversed by the main current is common to both; the effect of variations in the factor of power is then regulated by means of a rheostat in series with the movable coil traversed by the current in quadrature.

The annexed drawing illustrates the entire apparatus arranged for controlling a three-phase generator.

Figure 1 represents the left-hand portion of the diagram of the apparatus, Fig. 2 represents the right-hand portion.

1 represents the armature of the alternator, 2 the field coil thereof, 3 the armature of the exciting dynamo, 4 the field coil of the latter, 5 the rheostat in the field circuit of the alternator, and 6 a transformer delivering current proportional to the current flowing in one phase of the generator; the purpose of this transformer is to facilitate construction by allowing of adopting a single type of winding for the apparatus.

7 is a transformer, the purpose of which is analogous to that of transformer 6.

8 and 9 are two fixed coils connected in series and traversed by the secondary current from transformer 6.

10 is a movable coil connected in series with a non-inductive resistance 11 and a small fixed coil 12 joined across phase *a* and the neutral point of the secondary winding of transformer 7.

13 is a movable coil in series with a non-inductive resistance 14 and a small fixed coil 15 joined across phase *a* and the neutral point of the secondary winding of transformer 7.

16 is a small movable coil in series with a non-inductive resistance 17 and a small fixed coil 18 joined across phases $b$ and $c$ of the secondary winding of transformer 7.

19 is a fixed coil in series with a movable coil 20, joined across any two phases of transformer 7; in the drawing the coils are connected across phases $b$ and $c$. The movable coil 10 is suspended from a lever 21 pivoted at 22, and the movable coils 13, 16 and 20 are suspended from a lever 23 pivoted at 24.

For each of the groups 8—10, 9—13, 9—16, 19—20 the force developed on the movable parts is, as in the case of a watt-meter, at all times proportional to the product of the intensities circulating in the two coils; this force is downwardly directed. The magnetic field produced by the fixed coils is "canalized" by means of cut out metal plates as shown in the drawing.

The small fixed coils 12, 15, and 18 serve to counteract the effects of mutual induction between the coils 8 and 10, 9 and 13 and 9 and 16 respectively, supplying an induced electromotive force equal and opposite to that produced in the movable coil with which the respective fixed coils are connected in series.

25 is a connection comprising an antagonistic spring, one end of which is fixed to lever 21, the other end being adapted to surround a drum fixed to a toothed wheel 26.

27 is a continuous current motor, the field-coil 28 of which is continuously excited; this motor can be started and caused to work in either direction by means of the reversing switch 29, this switch being operated by means of the electro-magnets 30 and 31, which are fed at a pressure of approximately 10 volts from the coil of the transformer 7. If the lever 21 is moved up or down from its central position contact is made at 32 or 33, and the armature of the motor 27 is thus caused to revolve in one or the other direction. Theoretically the movement of the lever 21 could be directly used for operating the reversing switch 29, but in practice it is preferable to use relay apparatus; very much greater sensitiveness is by this means obtained.

To insure a quick break at the contacts 32 and 33 the following device is used. The contact - spring 34, which is fixed at 35 to the beam 21, carries a small armature 36 adapted to be attracted by either of the two electro-magnets 37 and 38 arranged in series with the relays 30 and 31 respectively. The break cannot, therefore, take place until a preliminary tensioning of the spring 35 has been effected.

As has already been mentioned the wattmeter formed by the coils 8 and 10 develops a couple which tends to rotate the beam 21 in the clockwise direction. Assuming, for instance, that the load decreases, the beam 21 rocks in the opposite direction, and contact 32 transmits current to the electro-magnet 30, which operates the reversing switch 29. The motor 27 then revolves in such a manner, that the tension of the spring 25 decreases. After the couple developed by this tension becomes equal to the couple acting in the opposite direction, the lever 21 is rocked in the opposite direction. However contact between 34 and 32 is momentarily preserved by the attraction of the electro-magnet 37 on the armature 36, until the insulated abutment 39 fixed to the lever 21 lowers the end of the spring 34. At this moment the contact at 32 is quickly broken, and the reversing switch 29 automatically returns to the "off" position shown in the drawing, under the action of a spring 65. When the switch is in this position the armature of the motor 27 is short-circuited and the movement thereof is quickly stopped. It is obvious that the same result could be obtained by arranging the reversing-switch 29 in such a manner that on being moved into the "off" position it causes a mechanical brake to be operated, for stopping the motor.

The action of the apparatus described may to some extent be interfered with by "pendulum" oscillations due to complex causes, such as the inertia of the beam and the parts connected therewith, the inertia of the reversing switch and the motor, and also the action of the auxiliary electro-magnets used to obtain a quick contact-break. These various causes act in such a manner as to produce retardation in the stopping of the motor, so that over-regulation takes place, and this in turn causes the beam, by means of the spring 25, to come into contact with the relay, which produces displacement in the opposite direction.

The detrimental effect of the electro-magnets 37 and 38 is also manifested by the production of a small couple at the moment when the spring 34 touches one of the contacts 32 or 33; the said couple, which tends to retain the spring on the contact in question, disappears suddenly at the moment of breaking contact. This action is exactly analogous to that which is produced in the case of an ordinary tachometrical governor.

In order to prevent the oscillations referred to, the electro-magnets 37 and 38, which only come into action at the moment when regulation is to be effected, are acted on by two iron armatures 40 and 41 fixed to springs 42 and 43, which bear on two rods 44 and 45 fixed to the lever 21. These springs act in such a manner as to develop a couple which tends to produce an earlier stoppage of the motor and which consequently tends to remove the lever 21 from the contact which is in action. It will be readily understood that by this means the injurious couple acting on the spring 34 can be neutralized, and that the apparatus can be so regulated that in the case of small variations of load the motor is not suddenly operated, or set in oscillatory motion, which is equivalent to a reduction of speed. In the case of a large and sudden variation of load the motor acts at high speed until the correction effected causes the couple developed by the springs 42 and 43 to preponderate over the couple corresponding to the correction which still remains to be effected; thereupon the correction or regulation takes place by means of an oscillatory movement, that is to say at reduced speed. The motor is thus stopped before it has effected the complete regulation and it is then restarted in order to complete the regulation at a progressively decreasing speed; the motor never moves beyond the position which corresponds to complete regulation.

In practice the springs 42 and 43 can also be so controlled with the aid of the reversing switch 29 that the extent of the oscillatory movement of the motor can also be regulated.

46 is an insulated abutment fixed on lever 21 and serving the same purpose as the abutment 39.

47 is the tachometrical governor and 48 the lever thereof.

49 is the spring which acts on the lever 48 in order to produce dynamometrical regulation, or if desired the procompensation of the tachometrical governor.

50 is the rod which controls the admission of motive fluid to the engine which drives the generator 1.

51 is a connection comprising an antagonistic spring one end of which is fixed to the lever 23 whereas the other is adapted to be wound on a drum fixed to the toothed wheel 52 mounted on the axle of the rheostat 5.

53 is a continuous current motor the field coil 54 of which is continuously excited by a current the direction of which does not change; the armature of this motor can thus be caused to move in either direction by means of the reversing switch 55. The latter is operated by displacing the lever 23, in a manner analogous in all respects to that described with reference to the operation of the switch 29 by means of the lever 21. The group of coils 19, 20 produces a couple proportional to the tension. The group 9 to 13 produces a couple proportional to the power absorbed, and the group 9 to 16 produces a couple which increases when the factor of power decreases. When the lever 23 rocks in clockwise direction the motor 53 is started in the direction which corresponds to a decrease of the excitation. This occurs on each diminution of load and the same takes place in the case of any reduction in the factor of power or of the tension, or on the other hand the motor is revolved in the opposite direction for increase of excitation, power, or tension.

The fixed coil 9 is connected in parallel with a rheostat 56, which allows of altering the degree of overcompounding by varying the couples produced by the groups 9 to 13 and 9 to 16.

In connecting the regulator with any given group of generators the resistance 14 is in the first place so adjusted that compensation is obtained when a circuit free from self-induction is being fed. Thereupon the resistance 17 is so adjusted that compensation is obtained with a given factor of power for example 0.7; during normal working it is then only necessary to adjust the rheostat 56 in order to control the degree of over-compounding, which necessarily varies with the load on the mains.

57 and 58 are two resistances traversed by the current which feeds the armatures 27 and 53, and which serve to control the strength of the starting current. Two lamps 59 and 60 are connected in parallel with these resistances and serve to indicate the manner in which the apparatus is working; normally these lamps must only glow temporarily during short intervals which succeed each other in comparatively rapid succession and which correspond to the periods of regulation.

61 and 62 as well as 63 and 64, are auxiliary switches placed in the relay circuits and automatically controlled by the rotation of the axles on which are mounted the wheels 26 and 52, so that the angular movement of the said wheels is limited; the purpose of this arrangement is to prevent damage in case of overload or of irregular working.

If several groups of alternators are working in parallel the transformer 6 must be joined up in such a manner that the primary coil thereof is traversed by the total current supplied by the groups collectively. Its secondary coil will then feed as many separate circuits as there are groups and the circuits corresponding to groups not working are cut out. The dynamometrical regulation then acts, in each group, proportionally to the total load but independently of the individual load; it follows that any cause tending to throw the individual loads out of balance operates the tachometrical governors in the same way as if they were used separately. The said governors being, in this particular case, arranged in such a manner as to allow of a wide interval between running on open circuit and running with a load, the conditions are highly favorable to securing satisfactory working in parallel while retaining perfect synchronism.

If the regulation of the pressure is effected by means of a field-rheostat it is obviously necessary to provide as many voltmetrical governors as there are groups, but if the field of a single exciter, common to all the generators, is controlled, it is sufficient to use a single voltmetrical governor.

If one terminal of the stator is permanently connected to the mains, the action required for starting the machine is restricted to operating a reversing-switch similar to either of those shown in the drawing, but without short-circuit contacts. This reverser can, with advantage, comprise two small double mercury switches. To prevent oxidation the air is preferably exhausted from the spaces within the tubes containing the contacts. Quick break is then obtained by arranging the movable parts of the switch in such a manner that the equilibrium thereof is only stable in the positions corresponding to full contact or to complete break.

What I claim as my invention is:—

1. In a regulating system for electric current distribution, the combination with the generator, a volt-metric governor for tension regulation and a tachymetric governor for mechanical regulation, of a dynamometrical governor, operated by variations of load and comprising a continuous current motor with independent excitation, a reversing switch for controlling said motor, a wattmeter device, a mechanical device operated by said motor and connected to the antagonistic couple of the watt meter, said mechanical device having a predetermined position for each value of the power delivered by the generator.

2. In a regulating system for electric current distribution, the combination with the generator, a volt-metric governor for tension regulation, and a tachymetric governor for mechanical regulation, of two dynamometrical governors operated by variations of load and coöperating respectively with the voltmetric and the tachymetric governor.

3. In a regulating system for electric current distribution, the combination with the generator and a volt-metric governor for tension regulation, of an electrical device adapted to exercise tractive effort increasing as the power delivered by the generator diminishes and to increase the excitation when for a constant load the dewatted current increases, in order to maintain constant tension at the centers of utilization under variations of the power delivered by the generator, said means having in common with the governor the circuit traversed by the principal current.

4. In a regulating system for electric current distribution, the combination with the generator and a volt-metric governor for tension regulation, of an electrical device adapted to exercise a tractive effort increasing as the power delivered by the generator diminishes and to increase the excitation when for a constant load the de-watted current increases, in order to maintain constant tension at the centers of utilization under variations of the power delivered by the generator said means having in common with the governor the circuit traversed by the principal current, and a variable resistance rheostat in parallel with the said circuit for adjusting the degree of over compoundage.

5. In a regulating system for electric current distribution, the combination with the generator and a volt-metric ernor for tension regulation and a tachymetric governor for mechanical regulation, of a dynamometrical governor, operated by variations of load and comprising a continuous current motor with independent excitation, a reversing switch for controlling said motor, a wattmeter device a rapid break low tension relay between said wattmeter and the reversing switch a mechanical device operated by said motor and connected to the antagonistic couple of the watt meter said mechanical device having a predetermined position for each value of the power delivered by the generator.

6. In a regulating system for electric current distribution, the combination with the generator, a volt-metric governor for tension regulation and a tachymetric governor for mechanical regulation, of a dynamometrical governor, operated by variations of load and comprising a continuous current motor with independent excitation, a reversing switch for controlling said motor, a wattmeter device, a mechanical device operated by said motor and connected to the antagonistic couple of the watt meter said mechanical device having a predetermined position for each value of the power delivered by the generator, and means for preventing "hunting" operated by the regulating movement to set up a counter force tending to arrest said movement before complete reëstablishment of equilibrium.

7. In a regulating system for electric current distribution, the combination with the generator, a volt-metric governor for tension regulation, and a tachymetric governor for mechanical regulation, of a dynamometrical governor, operated by variations of load and comprising a continuous current motor with independent excitation a reversing switch for controlling said motor, a wattmeter device, a mechanical device operated by said motor and connected to the antagonistic couple of the watt meter said mechanical device having a predetermined position for each value of the power delivered by the generator, and means electrically controlled by the reversing switch in its intermediate position adapted to short circuit the motor armature.

8. In a regulating system for electric current distribution the combination of a generator, a plurality of dynamometrical governors, a transformer having its primary in series with the total current furnished by the regulators in action, and having a plurality of secondaries equal in number to the groups capable of being coupled in parallel, and means for breaking circuit in the inactive groups for the purpose set forth.

In witness whereof I have signed this specification in the presence of two witnesses.

JOSEPH LOUIS ROUTIN

Witnesses:
J. VEYRE,
MARIN VACHON.